United States Patent [19]

Sato et al.

[11] Patent Number: 4,524,494
[45] Date of Patent: Jun. 25, 1985

[54] DETACHABLE FASTENER

[75] Inventors: Youji Sato, Yokohama; Nobuaki Omata; Sakuzo Shimbara, both of Hiroshima, all of Japan

[73] Assignee: Nifco Inc., Yokohama, Japan

[21] Appl. No.: 510,509

[22] Filed: Jul. 5, 1983

[30] Foreign Application Priority Data

Jul. 5, 1982 [JP] Japan ................. 57-115550

[51] Int. Cl.³ ............................. A44B 17/00
[52] U.S. Cl. .................... 24/453; 411/342; 24/297; 24/305; 174/138 D
[58] Field of Search ........... 24/453, 297, 614, 305; 411/508, 509, 510, 340–345; 174/138 D

[56] References Cited

U.S. PATENT DOCUMENTS

| | | | |
|---|---|---|---|
| 1,084,995 | 1/1914 | Wood | 411/342 |
| 3,534,650 | 10/1970 | Kubokawa | 24/453 |
| 3,829,741 | 8/1974 | Athey | 174/138 D |
| 4,373,826 | 2/1983 | Inamoto et al. | 24/297 X |
| 4,422,222 | 12/1983 | Notoya | 24/297 |
| 4,438,552 | 3/1984 | Omata | 24/297 X |
| 4,457,653 | 7/1984 | Leib | 411/344 X |

FOREIGN PATENT DOCUMENTS 566840 12/1958 Canada ................. 24/297

Primary Examiner—William E. Lyddane
Assistant Examiner—Peter A. Aschenbrenner
Attorney, Agent, or Firm—J. R. Halvorsen; T. W. Buckman

[57] ABSTRACT

A detachable fastener comprises a central shank provided at one end thereof with a head portion and at the other end thereof with leg pieces of the shape of legs of an anchor movably connected through respective hinges to the aforementioned other end, and a receiving part adapted to receive external force and formed as connected to the leading ends of the leg pieces projected from the aforementioned other end of the central shank. In this fastener, the receiving part on receiving an external force causes the leg pieces to be bent about the hinges and the free ends of the leg pieces to be converged.

10 Claims, 21 Drawing Figures

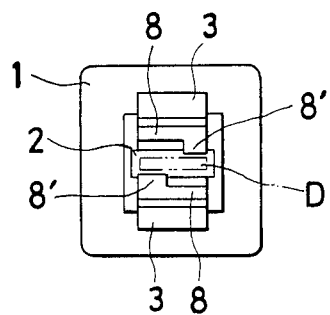
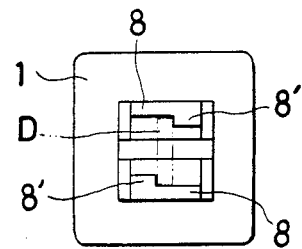
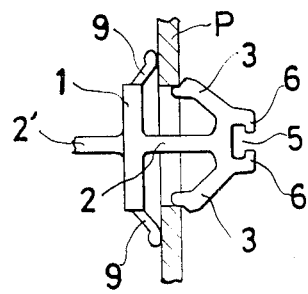
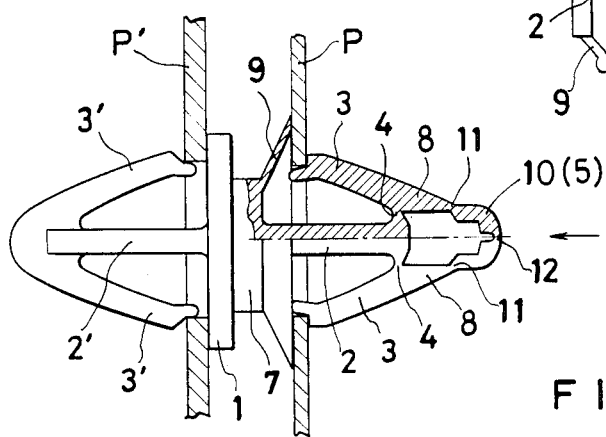
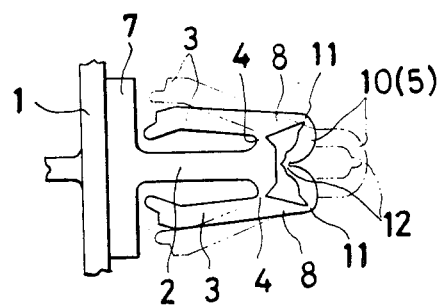

DETACHABLE FASTENER

BACKGROUND OF THE INVENTION

This invention relates to a detachable fastener, and more particularly to an anchor-shaped detachable fastener which comprises a central shank and an anchor-shaped leg piece formed at the leading end of the central shank so that when the central shank and the leg piece are jointly urged in the direction of the leading end thereof into a hole in a given panel, the fastener comes to retain the panel fast in position by pinching the edge of the hole in the panel between the free end of the leg piece and the head portion provided at the other end of the central shank and, when the leading end side of the central shank is simply manipulated to converge the leg pieces, the fastener releases the panel from its grip and allows itself to be pulled out of the hole in the panel.

Anchor-shaped fasteners of the type having two leg pieces folded back in the shape of anchor legs from the leading end of a central shank so that they will fasten a given panel in position when the leg pieces are forced past a hole in the panel and allowed to snap into fast contact with the opposite side of the panel have been known to the art (as disclosed in U.S. Pat. Nos. 3,611,861 and 3,722,037, for example). When these fasteners are desired to release the panel, the two legs must be squeezed as with pinchers. This work calls for much time and labor.

SUMMARY OF THE INVENTION

An object of this invention is to provide a fastener which can be detached by a simple operation from the fitting hole in a panel to which it has been in fast engagement.

To accomplish the object described above according to the present invention, there is provided a fastener which has one or two anchor-shaped leg pieces connected movably through the medium of hinges to the leading end of a central shank and also has formed at the leading end of the leg pieces a receiving part adapted to receive external force, so that an external force exerted on the receiving part bends and converges the leg pieces across the hinges, causing the leg pieces to release the panel and allowing them to slip out of the fitting hole of the panel.

The other objects and characteristic features of this invention will become apparent to those skilled in the art as the disclosure is made in the following description of preferred embodiments illustrated in the drawings.

BRIEF DESCRIPTION OF THE DRAWINGS

FIG. 7 is a front view of the fastener of FIG. 6.

FIG. 8 is an explanatory view illustrating the fastener of FIG. 6 in a state already released and ready for extraction.

FIG. 9 is a side view of the third embodiment of the detachable fastener according to the present invention.

FIG. 10 is a side view of the fourth embodiment of the detachable fastener according to the present invention.

FIG. 11 is an explanatory diagram illustrating the fastener of FIG. 10 in a state already released and ready for extraction.

DESCRIPTION OF PREFERRED EMBODIMENTS

Figure 1:
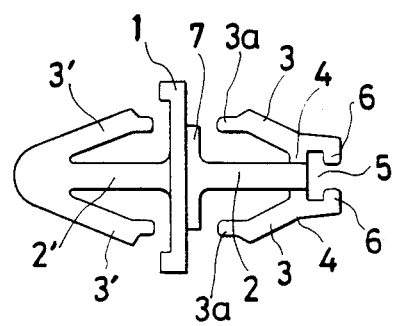
FIG. 1 is a side view of the first embodiment of the detachable fastener according to the present invention.
Figure 2:
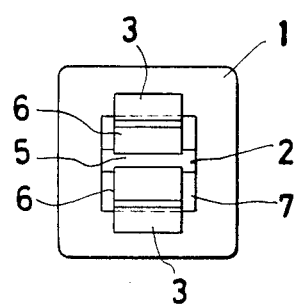
FIG. 2 is a front view of the fastener of FIG. 1.
Figure 3:
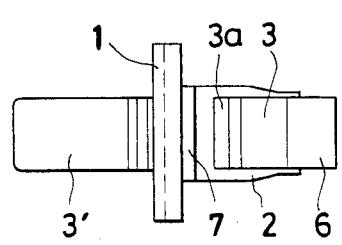
FIG. 3 is a plan view of the fastener of FIG. 1.
Figure 4:
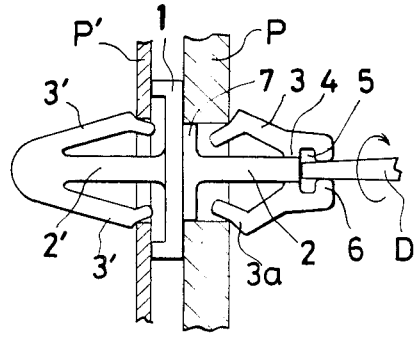
FIG. 4 is an explanatory diagram illustrating the fastener of FIG. 1 in a state readied for release from a panel.
Figure 5:
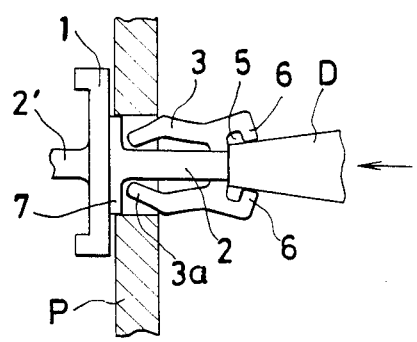
FIG. 5 is an explanatory diagram illustrating the fastener of FIG. 1 in a state already released and ready for extraction.

FIGS. 1–5 represent the first embodiment of the detachable fastener according to this invention. In the diagrams, 1 denotes a head portion, 2 a central shank, and 3 anchor-shaped leg pieces connected through hinges 4 to opposite sides of the leading end of the central shank and extending as folded backwardly. In this embodiment, the head portion 1 has one more central shank 2' extended oppositely from the central shank 2. The central shank 2' is provided at the leading end thereof with leg pieces 3'. These leg pieces 3' are not connected through hinges to the central shank 2' but are formed after the manner of the conventional anchor-type fastener.

The shank 2 is provided at the leading end thereof with a receiving part 5 serving to receive an external force as contemplated by this invention. In this embodiment, the receiving part 5 is in the form of a groove embraced in a pair of symmetrically opposed L-shaped projections 6 extended from the leading ends of the leg pieces 3 and, therefore, possessed of a cross section of the shape of the letter T.

When the central shank 2 and the leg pieces 3 are forced into a hole bored in a panel P, the leg pieces are slightly pushed toward the central shank by the edge of the hole. When one side of the panel collides with the head portion, step-like shoulders 3a formed at the free ends of the leg pieces snap into engagement with the edge of the hole on the other side of the panel and grip the panel P. When the central shank 2' and the leg pieces 3' are similarly forced into a hole bored in a panel P', the head portion 1 and the free ends of the leg pieces 3' nip the panel P' fast in position.

After the fastener has been put to use as described above, the tip D of a screw driver is inserted into the receiving part 5 (FIG. 4) and rotated by 90°. Consequently, the L-shaped projections 6 at the leading ends of the leg pieces are pushed backwardly by the broader side of the tip D of the driver to open and spread out the receiving part 5 and the leg pieces 3 are bent at the hinges 4 relative to the central shank 2 to converge the free ends. After the driver has been rotated by 90°, it is forced down enough to enable the central shank 2 and the leg pieces 3 to slip out of the hole of the panel P.

When a phillips screw driver is used, the insertion of the driver similarly results in the spreading of the receiving part and permits separation of the central shank 2 and the leg pieces 3 from the panel. The separation is obtained more simply in this case because the driver has only to be pressed down without any rotation about its axis.

When the separation of the fastener from the panel is effected by using the slot-type screw driver, if the central shank 2 and the leg pieces 3 are allowed to rotate simultaneously with the driver, the desired separation cannot be obtained. To prevent this combined rotation of the central shank 2 and the leg pieces 3, therefore, the hole bored in the panel is desired to have a shape other than circular. In the present embodiment, the hole is in the shape of a square. Similarly, the head portion 1 is desired to be provided with a portion 7 snugly fitting into the square hole and consequently precluding the aforementioned combined rotation. The central shank 2 is desired to be raised from this rotation preventing portion 7.

Figure 6:
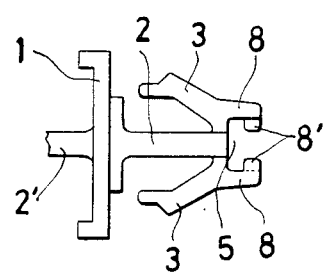
FIG. 6 is a side view of the second embodiment of the detachable fastener according to the present invention.

FIGS. 6-8 represent a second embodiment slightly modified from the first embodiment. A receiving part 5 is defined by projected pieces 8 which extend substantially parallelly from the leading ends of leg pieces 3. At the leading ends of the projected pieces 8, protuberances 8' are extended inwardly toward each other from diagonally opposite side areas of the projected pieces 8. To squeeze the leg portions 3, the tip D of a screw driver is inserted as indicated by the chain line in FIG. 7 and is turned by 90° as illustrated in FIG. 8. After this rotation, the tip of the screw driver is restrained by the protuberances 8' and cannot be rotated any further. In this embodiment, the protuberances 8' are made to fulfill the part of a stopper so that the leg pieces once converged by the rotation of the driver may be prevented from being spread out again because of excessive rotation of the driver.

The fasteners of the type like those of the first and second embodiments which have two fasteners extended in opposite directions from one head portion and which have one of the two fasteners detachably fastened to a given panel suit an application in which the other fastener is attached to the body of an automobile, for example, and the detachable fastener is used to fasten a radiator grille so that when the radiator grille requires repair, it may be readily released from the detachable fastener.

FIG. 9 illustrates a third embodiment of the detachable fastener. A head portion 1 is provided with resilient pieces 9 extended therefrom in the direction in which a central shank 2 is projected so that a panel P will be held fast as nipped between the leading ends of the leg pieces 3 and the resilient pieces 9. In this case, the central shank and the leg pieces are enabled by the resilient force of the resilient pieces 9 to slip out of the hole in the panel P when the tip (not shown) of a screw driver is inserted into a receiving part 5 and turned so as to converge the leg pieces 3. Thus, the provision of the resilient pieces proves advantageous in respect that the screw driver is not required to be further pressed down after it has been turned inside the receiving part. Although the resilient pieces 9 in this embodiment are illustrated as extended aslant from the opposite ends of the head portion, they are not necessarily required to be disposed in the manner just described. Optionally, one resilient piece of the shape of a skirt or suction disc may be projected from the entire periphery of the head portion.

FIGS. 10 and 11 represent the fourth embodiment of the detachable fastener. A head portion 1 is provided on one side thereof with a resilient piece 9 of the shape of a suction disc. On the same side, the head portion is provided with a central shank 2. The central shank 2 is provided with leg pieces 3 connected through hinges 4 to the opposite sides of the leading end thereof and folded backwardly in the shape of legs of an anchor. On the other side, the head portion is provided with a well known anchor-shaped fastener comprising a central shank 2' and leg pieces 3' similarly to the embodiment of FIGS. 1-3.

The two leg pieces 3 possess projected pieces 8 extended past the hinges 4. The receiving part 5 is formed of an arched piece 10 connecting the leading ends of the two projected pieces 8. The leading ends of the projected pieces 8 are connected through hinges 11 to the opposite ends of the arched piece 10. In the middle of the arched piece 10, a depression is formed on the inner side to give rise to a hinge 12.

This fastener is put to use by having the central shank 2' and the leg pieces 3' attached to the body of an automobile and the central shank 2 and the leg pieces 3 attached to a radiator grille, for example, to establish union between the automobile body and the radiator grille. To separate the radiator grille from the union, the arched piece 10 is depressed as indicated by the arrow in FIG. 10. Consequently, the arched piece 10 is bent as though crushed down at the position of the hinge 12 and the hinge 12 goes down past the hinges 11 and approaches the leading end of the central shank 2. As a result, the two projected pieces 8 have their upper portions spread out and the two leg pieces 3 have their free ends converged enough for the radiator grille to be removed from the automobile body.

The first through third embodiments described above are such that when the free ends of the two leg pieces are converged by means of a screw driver, the removal of the screw driver from within the receiving part allows the two leg pieces to regain their original shape. In the present embodiment, once the free ends of the two leg pieces are converged as described above, the two leg pieces remain in their converged state unless the hinge 12 moves outwardly past the line connecting the two hinges 11. For replacement of the removed radiator grille onto the automobile body, therefore, it suffices to open the free ends of the two leg pieces from their converged state with the finger tips, for example, and allow the arched piece 10 to regain its original shape or to pinch the arched piece between the finger tips, pull the hinge 12 forward to its original position, and open the free ends of the two leg pieces.

Unlike the aforementioned embodiments, the fourth embodiment only requires the arched piece 10, which acts in place of a receiving part, to be pushed down. Thus, the arched piece is very easy to use, especially in dark places, because it does not require the worker to grope for a receiving part into which to insert the tip of a screw driver.

Figure 12:
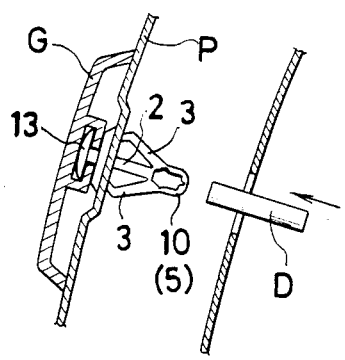
FIG. 12 is a side view illustrating the fifth embodiment of the detachable fastener according to this invention as held in a working position.

The head portion 1 may be provided, as illustrated in FIG. 12, with an engaging head 13 adapted to engage with a T-shaped groove on the rear side of a garnish G intended to be attached to the outer surface of an external plate P of the body of an automobile so that the garnish G will be attached fast to the outer surface of the external plate by having the engaging head 13 slid and set in position in the T-shaped groove and forcing the central shank and the two leg pieces into the hole bored in advance in the external plate P and, subsequently, desired removal of the garnish will be accomplished by inserting a rod-shaped tool D into a hole formed in an internal plate of the body of the automobile to press down the arched piece until it is fully bent down.

In the case of the aforementioned embodiment in which the arched piece 10 is formed in place of the receiving part 5, the sensation perceived by the worker when the two open leg pieces are forced into snapping engagement with the hole of the panel P can be made stronger by having the two leg pieces energized in their diverging direction.

Figure 13:
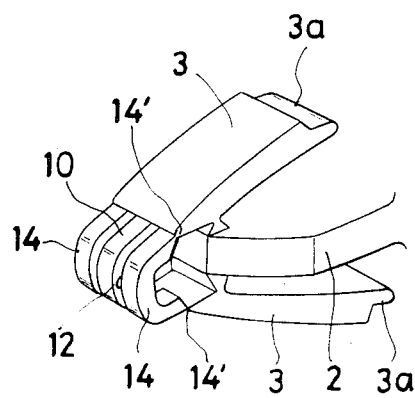
FIG. 13 is an enlarged perspective view of the essential part of the sixth embodiment of the detachable fastener according to the present invention.

For this purpose, the leading ends of projected pieces 8 of the two leg pieces may be interconnected with spring pieces 14 similar in shape to the arched piece 10 likewise serving to connect the two projected pieces 8, as contemplated in the sixth embodiment illustrated in FIG. 13. Although these spring pieces 14 are connected through hinges 14' to the leading ends of the projected pieces, the arched piece 10 is devoid of the hinge 12 which is formed in the middle of the arched piece in the earlier embodiment. In this case, desired convergence of the free ends of the two leg pieces is accomplished by depressing only the arched piece 10 and not the spring pieces 14.

Figure 14:
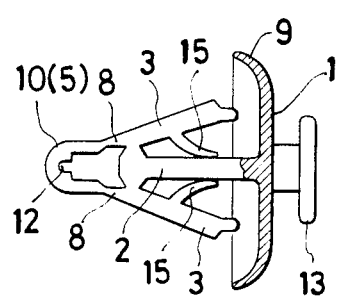
FIG. 14 is a partially sectioned side view of the seventh embodiment of the detachable fastener according to this invention.
Figure 15:
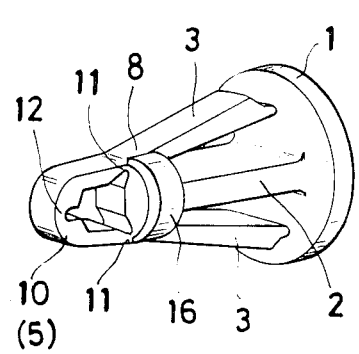
FIG. 15 is a perspective view of the eighth embodiment of the detachable fastener according to this invention.

Otherwise, spring pieces 15 may be extended from the surfaces of the two leg pieces opposed to the central shank 2 until their leading ends come into sliding contact with the central shank, as contemplated by the seventh embodiment illustrated in FIG. 14. Alternatively, these spring pieces 15 may be extended from the opposite sides of the central shank 2 until their leading ends come into sliding contact with the opposed sides of the two leg pieces. It is further permissible for the projected pieces 8 at the leading ends of the two leg pieces to be interconnected with intervening spring pieces 16 as illustrated in FIG. 15. Although these spring pieces are deformed when the arched piece is pressed down into a bent state and the free ends of the two leg pieces are converged, they normally energize the free ends of the two leg pieces in their diverging direction. When the two leg pieces are caused to open from their converged state, the resilient force accumulated in the spring pieces because of their deformation causes the two leg pieces to snap into their diverged state as soon as the hinge 12 moves past the working line connecting the hinges 11. When the central shank 2 and the two leg pieces 3 are forced into tight engagement with the hole in the panel P, step-like shoulders 3a formed in the leading ends of the leg pieces are caused by the same resilient force to snap into engagement with the edge of the hole snugly, with enhanced sensation caused to the operator's finger tips.

Figure 16:
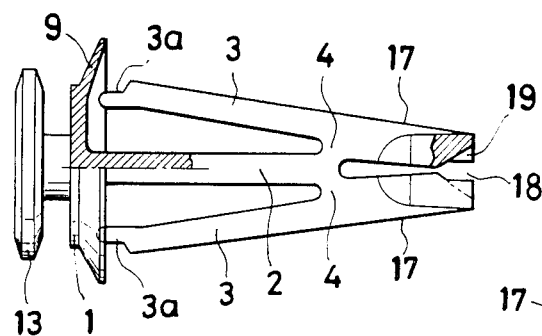
FIG. 16 is a partially sectioned side view of the ninth embodiment of the detachable fastener according to this invention.
Figure 17:
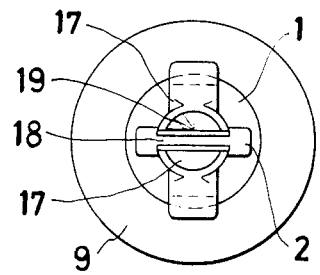
FIG. 17 is a front view of the fastener of FIG. 16.
Figure 18:
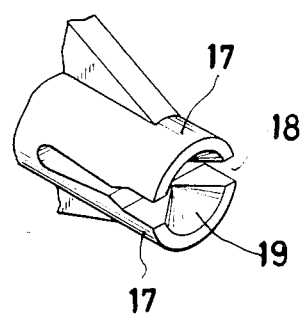
FIG. 18 is an enlarged perspective view of the essential part of the fastener of FIG. 16.

FIGS. 16–18 represent the ninth embodiment of the detachable fastener according to the present invention. It has a head portion 1 formed at one end of a central shank 2 and two leg pieces 3 connected through hinges 4 to the opposite sides of the leading end of the central shank 2. The head portion 1 has an engaging head 13 formed on the side thereof opposite from the central shank. This fastener is used for the purpose of fixing a garnish on the outer surface of an external plate of the body of an automobile as described previously. Of course, it may be provided with an ordinary anchor type fastener so as to be used on the body of an automobile.

The two leg pieces 3 possess projected pieces 17 which are extended past hinges 4. The projected pieces resemble a fork with two prongs separated by a slit 18 inserted from the leading ends. The insertion of this slit 18 results in formation of the hinges 4. The leading ends of the forked projected pieces form a tube equally halved by the interposition of the slit 18. This tube embraces a conical depression 19.

With this fastener, therefore, a garnish can be set in position with the engaging head 13 and it can then be attached to the body of an automobile with the resilient piece 9 and the shoulders 3a at the leading ends of the two leg pieces 3. Removal of the garnish is accomplished by having the tip of a screw driver inserted through the hole formed in the internal plate of the body of the automobile, applying it to the conical depression 19, and further pressing it down to open the slit 18. Consequently, the slit 18 is spread out from the forward end and the two leg pieces bend at their respective hinges to converge at their leading ends. Since the direction in which the screw driver is pushed down and the direction in which the garnish is separated from the automobile body coincide, the garnish is released from the automobile body.

Since this embodiment has a conical deprssion at the leading end thereof, it permits the blade of the screw driver to be set thereon snugly and easily.

Figure 19:
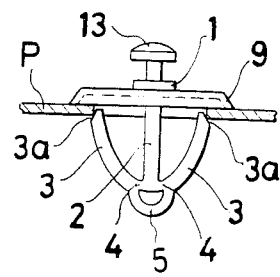
FIG. 19 is a side view of the tenth embodiment of the detachable fastener according to this invention.

The tenth embodiment of FIG. 19 has leg pieces 3 connected through hinges 4 to the opposite sides of the leading end of a central shank 2 and the outer portions of the hinges 4 are interconnected with an intervening receiving part 5 in the shape of an arch. In this case, when the receiving part 5 is pushed down with a finger tip or a proper tool, the pressure thus applied is directly transmitted to the leg pieces 3, converging the shoulders 3a at the leading ends thereof and permitting separation of the leg pieces from the hole in the panel P. In this embodiment, the leading end of each of the leg pieces is forked into two portions, one continuing into the receiving part 5 and the other into the hinge 4. Thus, the receiving part 5 and the hinge 4 each have a thickness about one half the original thickness of the leg piece. Thus, when the force exerted to push down the receiving part 5 is transmitted to the leg pieces 3, the hinge 4 yields to this force and causes the leg pieces to converge.

All of the embodiments so far described have two leg pieces connected through respective hinges to the leading end of a central shank. The number of leg pieces is not limited to 2 but may be freely selected. For example, just one leg piece will do.

Figure 20:
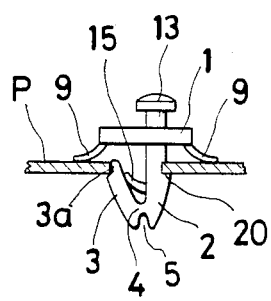
FIG. 20 is a side view of the eleventh embodiment of the detachable fastener according to this invention.
Figure 21:
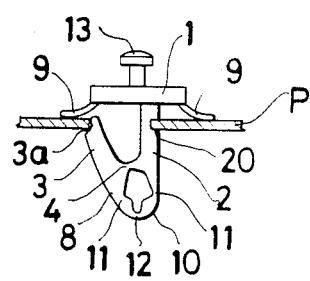
FIG. 21 is a side view of the twelfth embodiment of the detachable fastener according to this invention.

FIGS. 20–21 represent two embodiments wherein just one leg piece is connected to the leading end of a central shank. In this case, the central shank 2 is provided, at a position thereof substantially on a level with shoulder 3a in the free end of the leg piece 3, with a notch 20 adapted to be caught tightly on the edge of the hole, so that this notch 20 and the shoulders 3a will cooperate to keep firm hold of the edge of the hole in the panel P. In the embodiment of FIG. 20, the portion joining the leg piece 3 with the central shank 2 is provided with a receiving part 5 of the shape of a groove adapted to permit the tip of a screw driver to be inserted therein and rotated or pushed down. The formation of this receiving part 5 consequently gives rise to a hinge 4 across which the leg piece is movable relative to the central shank. By the manipulation with the aforementioned screw driver, the free end of the leg piece can be pressed inwardly toward the central shank.

In the embodiment of FIG. 21, an arched piece 10 similar to the arched piece described with reference to FIGS. 10–15 is disposed and connected through hinges 11 to a central shank 2 and a projected piece 8 of a leg piece 3. A depression is formed on the inner side in the middle of the arched piece to give rise to a hinge 12. When the arched piece 10 is pushed down, it is bent down so as to push the free end of the leg piece inwardly toward the central shank.

Thus, even with one leg piece, there can be provided a detachable fastener which can be separated from the panel by having the free end of the leg piece pushed inwardly toward the central shank.

All embodiments illustrated in the diagrams are formed integrally of a suitable plastic material. This invention, however, is not limited to detachable fasteners made of plastics. Optionally, the detachable fasteners of this invention may be formed of a metallic material.

As is clear from the foregoing description, the detachable fastener of this invention can be converted by a simple manipulation from the state attached fast to the panel to the state separated therefrom and, therefore, can be advantageously adopted for attachment of radiator grilles, garnishes, etc. to an automobile body.

What is claimed is:

1. A one-piece plastic detachable fastener comprising a central shank provided at one end thereof with a head portion, a pair of elongated diverging leg pieces resiliently connected intermediate their extremities through respective hinges to the other end of said central shank, the diverging ends of said legs forming the trailing ends while the opposite ends form the leading ends, said leading ends extending beyond said other end of said shank and being spaced from each other, and a receiving part adapted to receive an external spreading force and formed as flange means connected to the leading ends of said pair of leg pieces, whereby said receiving part on receiving said external spreading force bends said leg pieces about said hinges and brings the free ends of said pair of leg pieces toward each other.

2. A detachable fastener according to claim 1 wherein said flange means includes flanges extending from at least one of the free ends of said legs toward the other free end of said leg.

3. A detachable fastener according to claim 2, wherein said external force exerted on said receiving part is a rotational force.

4. A detachable fastener according to claim 2 wherein said flange means is hingedly interconnected and capable of over-center inversion to effectively spread the leading ends of said legs about their mid-point connection to said central shank, and thereby bring the free ends toward each other whereby said fastener can be removed from the apertured workpiece with which it is associated.

5. A detachable fastener according to claim 4, wherein said external force exerted on said receiving part is a pressing force.

6. A detachable fastener according to claim 1, wherein said head portion of said central shank is further provided with an anchor-shaped leg piece on the side thereof opposite from said central shank.

7. A detachable fastener according to claim 1, wherein said head portion of said central shank is further provided with an engaging head on the side thereof opposite from said central shank.

8. A detachable fastener according to claim 1 wherein spring means are provided between at least one of said legs and said central shank to provide spring-like resistance against movement of the free ends of said legs toward said central shank.

9. A detachable fastener according to claim 8 wherein said spring means includes a resilient spring arm extending between at least one of said legs and said shank, fixed to one of them and slidably contacting the other.

10. A detachable fastener according to claim 9 wherein each of said legs carries a spring arm which contact opposite sides of said shank.

* * * * *